United States Patent Office 3,350,398
Patented Oct. 31, 1967

3,350,398
2,4-DIAMINO-6-AMIDO-s-TRIAZINES
Takeo Ueda, 1066 Izumi, Komae-cho, Kitatama-gun; Shigeshi Toyoshima, 355 Funabashi-cho, Setagaya-ku; and Mitsuru Furukawa, 897 Yukigaya-cho, Ota-ku; all of Tokyo, Japan
No Drawing. Original application Mar. 28, 1963, Ser. No. 268,551, now Patent No. 3,271,393, dated Sept. 6, 1966. Divided and this application Mar. 3, 1966, Ser. No. 531,342
Claims priority, application Japan, July 3, 1962, 37/27,619
5 Claims. (Cl. 260—249.9)

This invention relates to new chemical compounds which are useful in inhibiting and/or inactivating measles, echo and coxsackie viruses. More particularly, this invention relates to 2,4-diamino- and 2-amino-4-(substituted)-amino-6-(N-carbonyl)-s-triazine.

This application is a division of application Serial No. 268,551, filed March 28, 1963, now U.S. Patent No. 3,271,393.

It is an object of this invention to provide a new class of chemical compounds which possess antiviral activity, and more particularly, compounds which inhibit and/or inactivate viruses which cause measles.

There are provided, according to the present invention, compounds having the formula I 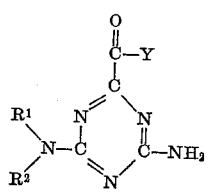

wherein $R^1$ and $R^2$ are members selected from the group consisting of hydrogen, alkyl, alkenyl, aryl, aralkyl and cycloalkyl, and wherein the group

taken together may be a heterocyclic group containing from 4 to 5 carbon atoms; and Y is a member selected from the group consisting of —OH,

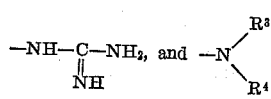

in which $R^3$ and $R^4$ are members selected from the group consisting of morpholino, piperidino, pyrrolidino, hydrogen, alkyl, alkenyl, aralkyl and aryl. The group

taken together may be, for example, morpholino 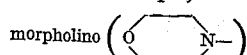

piperidino 

and pyrrolidino 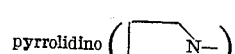

In a preferred embodiment of this invention, Y in Formula I is

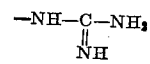

and the group

taken together is morpholino (i.e.,

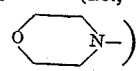 )

The compounds of the present invention (except those wherein Y is —OH) may be prepared by the reaction of an α-substituted biguanide having the formula II 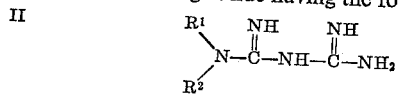

wherein $R^1$ and $R^2$ are the same as defined above, with a di(lower)alkyl oxalate, such as diethyl oxalate. The reaction may be conducted in an inert reaction media such as methanol. The reaction may be hastened by heating. This reaction results in the formation of a compound having the formula III 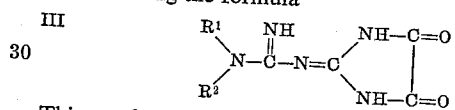

This product is then reacted with ammonia or an amine selected from the group consisting of

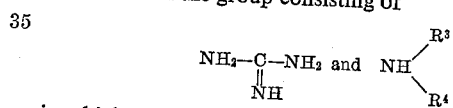

in which $R^3$ and $R^4$ are the same as defined above, preferably in an inert reaction medium such as ethanol. The reaction is preferably conducted at elevated temperatures. The product, represented by Formula I above, may be recovered by filtration. Alternatively, these compounds may be prepared in one step by reacting in the absence of any additional solvent an α-substituted biguanide having the Formula II above, a di(lower)alkyl oxalate and ammonia or an amine selected from the group consisting of

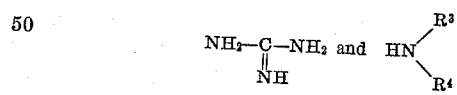

in which $R^3$ and $R^4$ are the same as defined above.

The compounds represented by Formula II are known in the art. For example, when $R^1$ and $R^2$ are both hydrogen, the compound is biguanide which is commercially available. When the group

taken together is morpholino (i.e.,

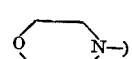 )

which is the preferred embodiment of this invention, the compound is 4-morpholinecarboximidoylguanidine which is described in Chemical Abstracts, 54, 10131 and 21510.

Another method for making the novel compounds of this invention (except those wherein Y is —OH) involves the reaction of a compound having the formula IV
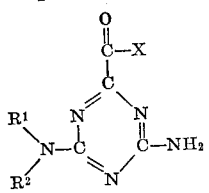

in which $R^1$ and $R^2$ are the same as defined above and X is a member selected from the group consisting of chloro, bromo, fluoro, iodo, and —$OR^5$ ($R^5$ being alkyl), with ammonia or an amine selected from the group consisting of

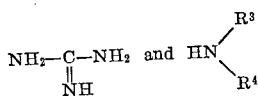

in which $R^3$ and $R^4$ are the same as defined above. Compounds of Formula IV in which X is —$OR^5$ may be obtained by the reaction of a compound of Formula III with an alcohol; or by the reaction of a compound of Formula II, a di(lower)alkyl oxalate and an alcohol.

Compounds represented by Formula I wherein Y is hydroxyl may be synthesized by the hydrolysis of a compound of Formula IV in which X is —$OR^5$; or by the hydrolysis of a compound of Formula III, or by reacting a compound of Formula II with an oxalic acid monoester. The product from any of these reactions may be further reacted with a halogenation reagent to obtain a compound of Formula IV in which X is halogen.

The compounds of this invention possess useful antiviral activity, particularly virucidal activity. The compounds of the present invention are effective in inhibiting the multiplication of the measles virus (Edmonstan strain). They have also been found to be effective against echo and coxsackie viruses. The compounds of this invention are also useful in the study of viruses, particularly as a tool to facilitate study of their basic biological characteristics, including their intracellular multiplication.

The following examples will illustrate the preparation of the compounds of the present invention.

EXAMPLE 1

A solution of sodium methoxide (0.1 mole) in absolute methanol is added, with heating and stirring, to a suspension of 0.1 mole of powdered 4-morpholinecarboximidoylguanidine hydrochloride in absolute methanol. NaCl which is formed as a precipitate is removed by filtration. Diethyl oxalate (0.1 mole) is then added and the solution is refluxed for 30 minutes on a steam bath. The reaction which occurs may be represented by the following equation:

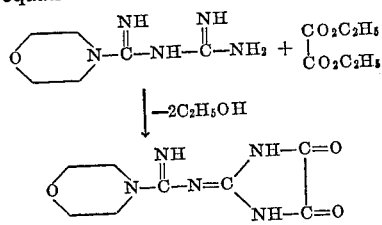

The reaction mixture is allowed to stand overnight and the precipitated product is collected by filtration. The product is found to have a melting point of 268° C., a yield of 79%.

*Elemental analysis.*—Calculated for $C_8H_{11}O_3N_5$: N, 31.10%. Found, 31.02%.

A suspension of 0.01 mole of the product obtained above is refluxed in 150 cc. of absolute ethanol until all of the material has been dissolved. To the solution there is added 0.01 mole of guanidine and the mixture is refluxed for 5 hours. A white precipitate is formed during the refluxing. The reaction which occurs may be represented by the following equation:

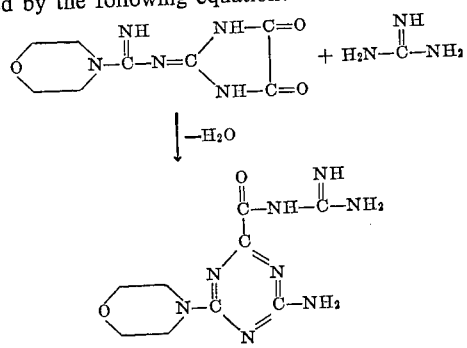

The reaction mixture is concentrated, the precipitate recovered and recrystallized from water. The product, 2-amino-4-morpholino-6 - (N-amidinocarbamoyl)-s-triazine, consists of prisms having a melting point of 271° C.

*Elemental analysis.*—Calculated for $C_9H_{14}O_2N_8$: N, 42.08%. Found: N, 41.50%.

The inhibitory effect of 2-amino-4-morpholino-6-(N-amidinocarbamoyl)-s-triazine on the multiplication of polio virus (type 1—Mahoney and type 2—$MEF_1$) and measles (Edmonstan strain) is determined using the standard tissue culture method. KB cells were used for polio and Hep. No. 2 cells for measles. Table I sets forth the Tissue Culture Inhibitory Dose $(TCID)_{50/0.1\ ml.}$ for the compound tested as well as for the control.

TABLE I

| Viral Material | $TCID_{50/0.1}$ ml. | |
|---|---|---|
| | Control | Treated |
| Polio: | | |
| Type 1—Mahoney | $10^{-7}$ | $10^{-3}$ |
| Type 2—$MEF_1$ | $10^{-6.5}$ | $10^{-3.5}$ |
| Measles: Edmonstan | $10^{-7}$ | $10^{-3}$ |

In another test procedure, the minimum inhibitory concentration of 2-amino-4 - morpholino-6 - (N-amidinocarbamoyl)-s-triazine on measles virus in Hep. No. 2 cells is determined. The results are set forth in Table II.

TABLE II

| Concentration of compound (in mole): | Results |
|---|---|
| $10^{-3}$ | 4/4 |
| $4 \times 10^{-4}$ | 4/4 |
| $2 \times 10^{-4}$ | 0/4 |
| None | 0/4 |

(In the results column, the denominator denotes the total number of assay tubes used in the experiment and the numerator denotes the number of tubes in which no cytopathogenic effect was observed.)

The minimum inhibitory concentration of 2-amino-4-morpholino-6 - (N-amidinocarbamoyl) - s-triazine on the Mahoney strain of virus ($10^{-6}$) is found to be $4 \times 10^{-4}$ mole.

The following examples are illustrative of the preparation of various intermediates of the type represented for Formula III, above:

EXAMPLE 2

*Preparation of 1,1-dimethyl-3-(4,5-dioxo-2-imidazolidinylidene)-guanidine*

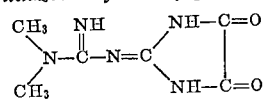

Sodium ethoxide prepared from 0.23 g. of metallic sodium and a small amount of dehydrated ethanol is added, with warming, to a suspension of 1.65 g. of 1,1-dimethylbiguanide hydrochloride in 5 cc. of dehydrated ethanol. After the precipitated NaCl is filtered off, 1.46 g. of diethyl oxalate is added into the filtrate and allowed to stand overnight. The resulting precipitate is collected by suction. Yield 1.13 g. (62%), M.P. 266–267° C. (with decomposition).

Analysis.—Calcd. for $C_6H_9O_2N_5$: C, 39.34; H, 4.95; N, 38.28. Found: C, 39.61; H, 4.90; N, 38.32.

EXAMPLE 3

Preparation of 1,1-(2,2-oxydiethyl)-3-(4,5-dioxo-2-imidazolidinylidene)-guanidine

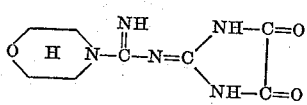

To a solution of 21 g. of 1,1-(2,2-oxydiethyl)-biguanide hydrochloride in 1 l. of dehydrated methanol is added sodium methoxide prepared from 2.5 g. of metal sodium and a suitable volume of dehydrated methanol. The precipitated NaCl is removed by filtration. After addition of 15 g. of diethyl oxalate to the filtrate and allowing to stand for 2 hours, the resulting precipitate is collected by suction; yield 19.8 g. (79%), M.P. 268° C. (with decomposition).

Analysis.—Calcd. for $C_8H_{11}O_3N_5$: N, 31.10. Found: N, 31.02.

EXAMPLE 4

Preparation of 1-(p-methoxyphenyl)-3-(4,5-dioxo-2-imidazolidinylidene)-guanidine

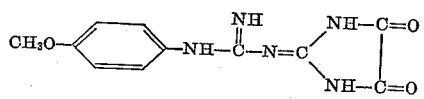

To a solution of 2.07 g. of 1-(p-methoxyphenyl)-biguanide in 5 cc. of dehydrated methanol is added 1.46 g. of diethyl oxalate. After allowing to stand for 2 hours, the yellow precipitate immediately deposited from the reaction mixture is collected by filtration; yield 2.40 g. (92%), M.P. 208° C. (with decomposition).

Analysis.—Calcd. for $C_{11}H_{11}O_3N_5$: N, 26.81. Found: N, 27.05.

Other examples of intermediates of the type represented by Formula III which are prepared by the general method described above are set forth in Table III.

EXAMPLE 9

Preparation of 4-amino-6-isopropylamino-s-triazine-2-carbanilide

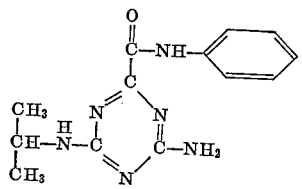

A suspension of 1.97 g. of 1-isopropyl-3-(4,5-dioxo-2-imidazolidinylidene)-guanidine in 5 cc. of aniline is heated on a water bath until completely dissolved. After a completion of the reaction, an excess of aniline is distilled off under reduced pressure. The resulting residue is recrystallized from ethanol to colorless plates which melt at 218–219° C.: yield 1.14 g. (42%).

Analysis.—Calcd. for $C_{13}H_{16}ON_6$: N, 30.80. Found: N, 30.80.

EXAMPLE 10

Preparation of 4-amino-6-cyclohexyl-amino-s-triazine-2-carboxypiperidide

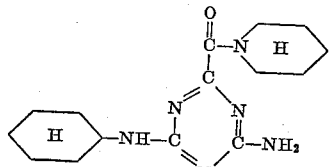

A mixture of 2.37 g. of 1-cyclohexyl-3-(4,5-dioxo-2-imidazolidinylidene)-guanidine and 1 cc. of piperidine is heated for 1 hour on a water bath. The resulting precipitate is collected by suction on cooling and recrystallized from ethanol to colorless prisms which melt at 266° C.; yield 1.64 g. (54%).

Analysis.—Calcd. for $C_{15}H_{24}ON_6$: N, 27.61. Found: N, 27.89.

EXAMPLE 11

Preparation of 4-amino-6-(p-methoxyphenylamino)-s-triazine-2-carboxypyrrolidide

TABLE III

| Example | Group $\begin{array}{c}R^1\\\diagdown\\N\\\diagup\\R^2\end{array}$ of Formula III | Melting Point (° C.) | Yield (percent) | Molecular Formula | Analysis N, percent | |
|---|---|---|---|---|---|---|
| | | | | | Calc. | Exper. |
| 5 | $NH_2$— | >300 | | $C_4H_5O_2N_5$ | 45.15 | 45.50 |
| 6 | iso-$C_3H_7NH$— | 218 | 77 | $C_7H_{11}O_2N_5$ | 35.52 | 35.90 |
| 7 | ⌬—NH— | 249 | 83 | $C_{10}H_{15}O_2N_5$ | 29.52 | 29.80 |
| 8 | $CH_3$—⌬—NH— | 214 | 95 | $C_{11}H_{11}O_2N_5$ | 28.56 | 28.86 |

The following examples are illustrative of the preparation of various compounds represented by Formula I, above:

A mixture of 2.61 g. of 1-(p-methoxyphenyl)-3-(4,5-dioxo-2-imidazolidinylidene)-guanidine and 1 cc. of pyrrolidine is refluxed for 1 hour on a water bath. After cooling, the deposited precipitate is collected by filtration and recrystallized from ethanol to colorless needles which melt at 215–216° C.; yield 1.82 g. (58%).

Analysis.—Calcd. for $C_{15}H_{18}O_2N_6$: N, 26.74. Found: N, 26.73.

EXAMPLE 12

Preparation of 4-amino-6-(N-morpholinyl)-s-triazine-2-carboxyguanidide hydrate

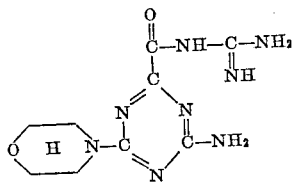

A suspension of 2.25 g. of 1,1-(2,2-oxydiethyl)3-(4,5-dioxo-2-imidazolidinylidene)-guanidine in 150 cc. of dehydrated ethanol is refluxed for about 10 hours. After completely dissolving, 0.6 g. of guanidine is added into the reaction mixture to reflux for 5 hours. The deposited precipitate which forms on concentration of the solution is collected by filtration upon cooling and recrystallized from water to give colorless prisms which melt at 271° C.; yield 1.3 g. (36%).

Analysis.—Calcd. for $C_9H_{16}O_3N_8$: C, 38.02; H, 5.67; N, 39.42. Found: C, 38.19; H, 5.23; N, 39.33.

EXAMPLE 13

Preparation of 4-amino-6-(p-toluidino)-s-triazine-2-carboxypyrrolidide

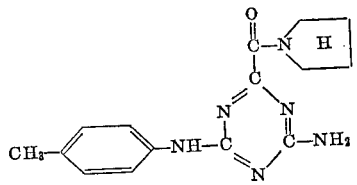

A mixture of 2.45 g. of 1-(p-tolyl)-3-(4,5-dioxo-2-imidazolidinylidene)-guanidine and 0.71 g. of pyrrolidine is heated for 2 hours on a water bath. After a completion of the reaction, the resulting residue is recrystallized from a small amount of ethanol to give colorless prisms which melt at 258° C.; yield 1.24 g. (50%).

Analysis.—Calcd. for $C_{15}H_{18}ON_6$: N, 28.17. Found: N, 28.34.

EXAMPLE 14

Preparation of 4-amino-6-(p-toluidino)-s-triazine-2-carboxylic acid

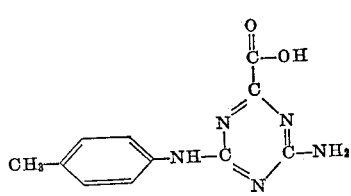

Procedure 1.—2.45 g. of 1-(p-tolyl)-3-(4,5-dioxo-2-imidazolidinylidene)-guanidine is dissolved in a dilute alkaline aqueous solution and the solution is neutralized with hydrochloric acid. The resulting precipitate is collected by suction, washed with hot water and dried at 105° C. under pressure; M.P. 234–235° C. (with decomposition).

Analysis.—Calcd. for $C_{11}H_{11}O_2N_5$: C, 53.87; H, 4.52; N, 28.56. Found: C, 53.21; H, 4.29; N, 28.48.

Procedure 2.—2.7 g. of ethyl 4-amino-6-(p-toluidino)-s-triazine-2-carboxylate is refluxed with ethanolic sodium hydroxide solution for 5 hours. After cooling the precipitate is collected and dissolved in a small amount of water, followed by neutralization with hydrochloric acid, and the colorless crystals precipitated are collected by suction, M.P. 234–235° C.

Procedure 3.—A mixture of 1.91 g. of 1-(p-tolyl)-biguanide and 1.51 g. of potassium salt of monoethyl oxalate in dehydrated ethanol is refluxed for 10 hours. When cool, the precipitate is filtered and dissolved in a small amount of water. The solution is neutralized with hydrochloric acid and the colorless crystals precipitated are collected by suction, M.P. 234–235° C.

EXAMPLE 15

(Procedure 1) Preparation of ethyl 4-amino-6-(N-morpholinyl)-s-triazine-2-carboxylate

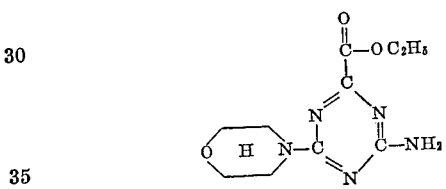

2.25 g. of 1,1-(2,2-oxydiethyl)-3-(4,5-dioxo-2-imidazolidinylidene)-guanidine in 150 cc. of dehydrated ethanol is refluxed for 10 hours. The mixture is concentrated, followed by chilling. The precipitate is filtered and recrystallized from ethanol to obtain colorless prisms; yield 1.62 g., M.P. 172° C.

Analysis.—Calcd. for $C_{10}H_{15}O_3N_5$: N, 27.66. Found: N, 28.13.

(Procedure 2) Preparation of 4-amino-6-(N-morpholinyl)-s-triazine-2-carboxyguanidide To a solution of 2.53 g. of ethyl 4-amino-6-(N-morpholinyl)-s-triazine-2-carboxylate in 100 cc. of dehydrated ethanol, 0.6 g. of guanidine was added. After refluxing on a water bath for 5 hours, the mixture was concentrated and chilled. The precipitate was collected by suction, recrystallized from water to colorless prisms; M.P. 271° C.

EXAMPLE 16

Preparation of 4-amino-6-(p-toluidino)-s-triazine-2-carboxypyrrolidide

To 2.45 g. of 4-amino-6-(p-toluidino)-s-triazine-2-carboxylic acid prepared by the above method is added an excess amount of thionyl chloride. After removal of excess thionyl chloride in vacuo, 1.5 cc. of pyrrolidine is added to the residue, and warmed on a water bath for 2 hours. After cooling, a diluted solution of alkali is added to the mixture, the resulting precipitate is recrystallized from ethanol to colorless prisms; yield 1.8 g., M.P. 258° C.

Further examples of compounds of this invention represented by Formula I and which are prepared by the general methods described above are set forth in Table IV.

TABLE IV

| Ex. | Group $\begin{matrix}R_1\\N\\R_2\end{matrix}$ of Formula I | Group Y of Formula I | Appearance | Melting Point (°C.) | Yield (percent) | Molecular Formula | Analysis N, Percent Calc. | Analysis N, Percent Exper. |
|---|---|---|---|---|---|---|---|---|
| 17 | iso-$C_3H_7NH-$ | $-NH-C_4H_9-n$ | Needles | 172–173 | 51 | $C_{11}H_{20}ON_6$ | 33.31 | 33.08 |
| 18 | iso-$C_3H_7NH-$ | -N⬡H (pyrrolidine) | Plates | 244 | 64 | $C_{11}H_{18}ON_6$ | 33.58 | 33.11 |
| 19 | iso-$C_3H_7NH-$ | -N⬢H (piperidine) | do | 266 | 59 | $C_{12}H_{20}ON_6$ | 31.80 | 31.78 |
| 20 | iso-$C_3H_7NH-$ | -N⬢H-O (morpholine) | do | 273 | 38 | $C_{11}H_{18}O_2N_6$ | 31.56 | 31.72 |
| 21 | ⬡H–NH– (cyclopentyl) | $-NH-C_3H_7$-iso | Rhombic Prisms | 175–176 | 48 | $C_{13}H_{22}N_6$ | 30.20 | 30.55 |
| 22 | ⬡H–NH– | -N⬡H | do | 246 | 57 | $C_{14}H_{22}N_6$ | 28.95 | 28.73 |
| 23 | ⬡H–NH– | -N⬢H-O | Plates | 214–215 | 36 | $C_{14}H_{22}O_2N_6$ | 27.43 | 27.49 |
| 24 | ⬡H–NH– | $-NH-$⬡ (phenyl) | do | 239 | 38 | $C_{16}H_{20}ON_6$ | 26.91 | 26.80 |
| 25 | O⬢H N– (morpholino) | -N⬡H | Rhombic Prisms | 205–206 | 53 | $C_{12}H_{18}O_2N_6$ | 30.20 | 30.20 |
| 26 | O⬢H N– | -N⬢H | do | 274 | 52 | $C_{13}H_{20}O_2N_6$ | 28.75 | 28.95 |
| 27 | O⬢H N– | -N⬢H-O | Plates | 184 | 57 | $C_{12}H_{18}O_3N_6$ | 28.56 | 28.86 |
| 28 | O⬢H N– | $-NH-$⬡ | Needles | 253–254 | 31 | $C_{14}H_{16}O_2N_6$ | 27.99 | 28.02 |
| 29 | $CH_3-$⬡$-NH-$ | $-NH-C_3H_7$-iso | do | 221–222 | 56 | $C_{14}H_{18}ON_6$ | 29.35 | 29.33 |
| 30 | $CH_3-$⬡$-NH-$ | $-NH-C_4H_9-n$ | do | 193 | 63 | $C_{15}H_{20}ON_6$ | 27.98 | 28.16 |
| 31 | $CH_3-$⬡$-NH-$ | -N⬡H | Rhombic Prisms | 245 | 51 | $C_{16}H_{20}ON_6$ | 26.91 | 27.12 |
| 32 | $CH_3-$⬡$-NH-$ | -N⬢H-O | Plates | 251 | 62 | $C_{15}H_{18}O_2N_6$ | 26.74 | 26.84 |
| 33 | $CH_3-$⬡$-NH-$ | $-NH-$⬡ | do | 239 | 39 | $C_{17}H_{16}ON_6$ | 26.24 | 26.11 |
| 34 | $CH_3O-$⬡$-NH-$ | $-NH-C_3H_7$-iso | Rhombic Prisms | 183–185 | 62 | $C_{14}H_{18}O_2N_6$ | 27.80 | 27.94 |
| 35 | $CH_3O-$⬡$-NH-$ | -N⬡H | do | 254–255 | 54 | $C_{16}H_{20}O_2N_6$ | 25.60 | 25.68 |
| 36 | $CH_3O-$⬡$-NH-$ | -N⬢H-O | Plates | 236 | 41 | $C_{15}H_{18}O_3N_6$ | 25.44 | 25.68 |
| 37 | $CH_3O-$⬡$-NH-$ | $-NH-$⬡ | do | 256 | 37 | $C_{17}H_{16}O_2N_6$ | 24.99 | 25.28 |

EXAMPLE 38

In the process of Example 1, when the 4-morpholine-carboximidoylguanidine hydrochloride is replaced with 0.1 mole of the hydrochlorides of biguanide, α-methylbiguanide, α-ethylbiguanide, α-methyl-α-isopropylbiguanide, α-n-butylbiguanide, α-isobutylbiguanide, β-pentyl-α-t-butylbiguanide, α-hexylbiguanide, α-2-ethylhexylbiguanide, 4-piperidinecarboximidoylguanidine, 4-pyrrolidinecarboximidoylguanidine, and 2-cyclohexylbiguanide, respectively, there are obtained, instead of 2-amino-4-morpholino-6-(N-amidinocarbamoyl)-s-triazine as the final product, the corresponding 2,4-diamino-6-(N-amidinocarbamoyl)-s-triazine,
2-amino-4-N-methylamino-6-(N-amidinocarbamoyl)-s-triazine,
2-amino-4-N-ethylamino-6-(N-amidinocarbamoyl)-s-triazine,
2-amino-4-(N-methyl-N-isopropylamino)-6-(N-amidinocarbamoyl)-s-triazine, 2-amino-4-N-n-butylamino-6-(N-amidinocarbamoyl)-s-triazine,
2-amino-4-isobutylamino-6-(N-amidinocarbamoyl)-s-triazine,
2-amino-4-(N-pentyl-N-t-butylamino)-6-(N-amidinocarbamoyl)-s-triazine,
2-amino-4-hexylamino-6-(N-amidinocarbamoyl)-s-triazine,
2-amino-4-(2-ethylhexylamino)-6-(N-amidinocarbamoyl)-s-triazine,
2-amino-4-piperidino-6-(N-amidinocarbamoyl)-s-triazine,
2-amino-4-pyrrolidino-6-(N-amidinocarbamoyl)-s-triazine, and
2-amino-4-cyclohexylamino-6-(N-amidinocarbamoyl)-s-triazine

We claim:
1. A compound selected from the group consisting of compounds of the formula

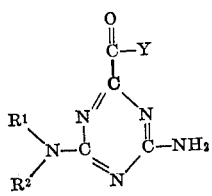

wherein $R^1$ and $R^2$ are members selected from the group consisting of hydrogen, (lower)alkyl, phenyl, (lower)alkyl-substituted phenyl, (lower)alkoxy-substituted phenyl and cyclohexyl, and Y is a member selected from the group consisting of morpholino, piperidino, pyrrolidino, (lower)alkylamino, phenylamino, and a radical of the formula

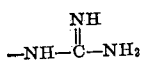

2. The compound of claim 1 having the formula

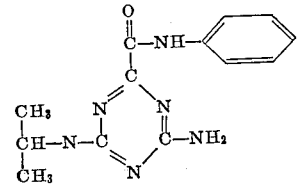

3. The compound of claim 1 having the formula

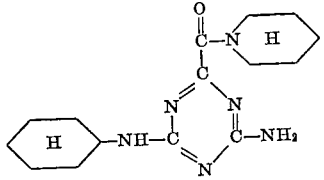

4. The compound of claim 1 having the formula

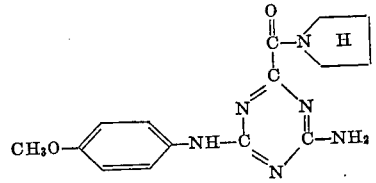

5. The compound of claim 1 having the formula

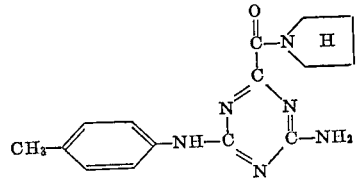

References Cited

Smolin et al., "s-Triazines and Derivatives," Interscience Pub. Inc., New York, (1959), pp. 244–252.

WALTER A. MODANCE, *Primary Examiner.*

J. D. RANDOLPH, *Examiner.*

J. M. FORD, *Assistant Examiner.*